United States Patent
Hofmann et al.

(10) Patent No.: US 6,803,721 B2
(45) Date of Patent: Oct. 12, 2004

(54) HALOGEN INCANDESCENT LAMP

(75) Inventors: Bernd Hofmann, Aachen (DE); Andreas Wever, Uebach-Palenberg (DE); Heinz-Josef Offermanns, Geilenkirchen (DE); Dieter Rosenbaum, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/257,692

(22) PCT Filed: Mar. 14, 2002

(86) PCT No.: PCT/IB02/00784
§ 371 (c)(1),
(2), (4) Date: Oct. 15, 2002

(87) PCT Pub. No.: WO02/075778
PCT Pub. Date: Sep. 26, 2002

(65) Prior Publication Data
US 2003/0127980 A1 Jul. 10, 2003

(30) Foreign Application Priority Data
Mar. 16, 2001 (DE) .......................... 101 12 690

(51) Int. Cl.[7] .............................. H01K 1/50; H01J 1/94
(52) U.S. Cl. ...................... 313/579; 313/279; 313/273; 313/274; 313/285; 313/49
(58) Field of Search .................................. 313/271–279, 313/283–285, 286, 292, 623–624, 634, 49, 569, 578, 579

(56) References Cited

U.S. PATENT DOCUMENTS

| 3,496,403 | A | * | 2/1970 | Palermo et al. | 313/579 |
| 3,717,783 | A | * | 2/1973 | Notelteirs et al. | 313/580 |
| 3,777,207 | A | * | 12/1973 | Notelteirs et al. | 313/578 |
| 4,415,833 | A | * | 11/1983 | Oetken et al. | 313/559 |
| 5,146,134 | A | * | 9/1992 | Stadler et al. | 313/579 |
| 5,367,220 | A | * | 11/1994 | Stadler et al. | 313/578 |
| 5,760,543 | A | * | 6/1998 | Gmeiner | 313/578 |

FOREIGN PATENT DOCUMENTS

| DE | 4106851 | 9/1991 | ............ H01K/1/18 |

* cited by examiner

Primary Examiner—German Colon
(74) Attorney, Agent, or Firm—Ernestine C. Bartlett

(57) ABSTRACT

The invention relates to a halogen incandescent lamp for operating on line voltage, at least comprising a hermetically sealed, cylindrical bulb (2) made from transparent material, a filling made from inert gas and a halogen additive, a luminous element (4), a current supply system, and a mount (5), which is formed from a single-piece support wire, one end region of which is bent away transversely to the lamp axis, and which retains the luminous element (4) in the vicinity of the end of the bulb (2) remote from the pinch, wherein a luminous element (4) bent virtually into a U-shape is arranged symmetrically relative to the lamp axis, the luminous element (4) is held twice by the mount (5) in the region of the portion of the luminous element (4) which is arranged transverse to the lamp axis, and one end of the mount (5) is fixed in a pinch (3).

11 Claims, 1 Drawing Sheet

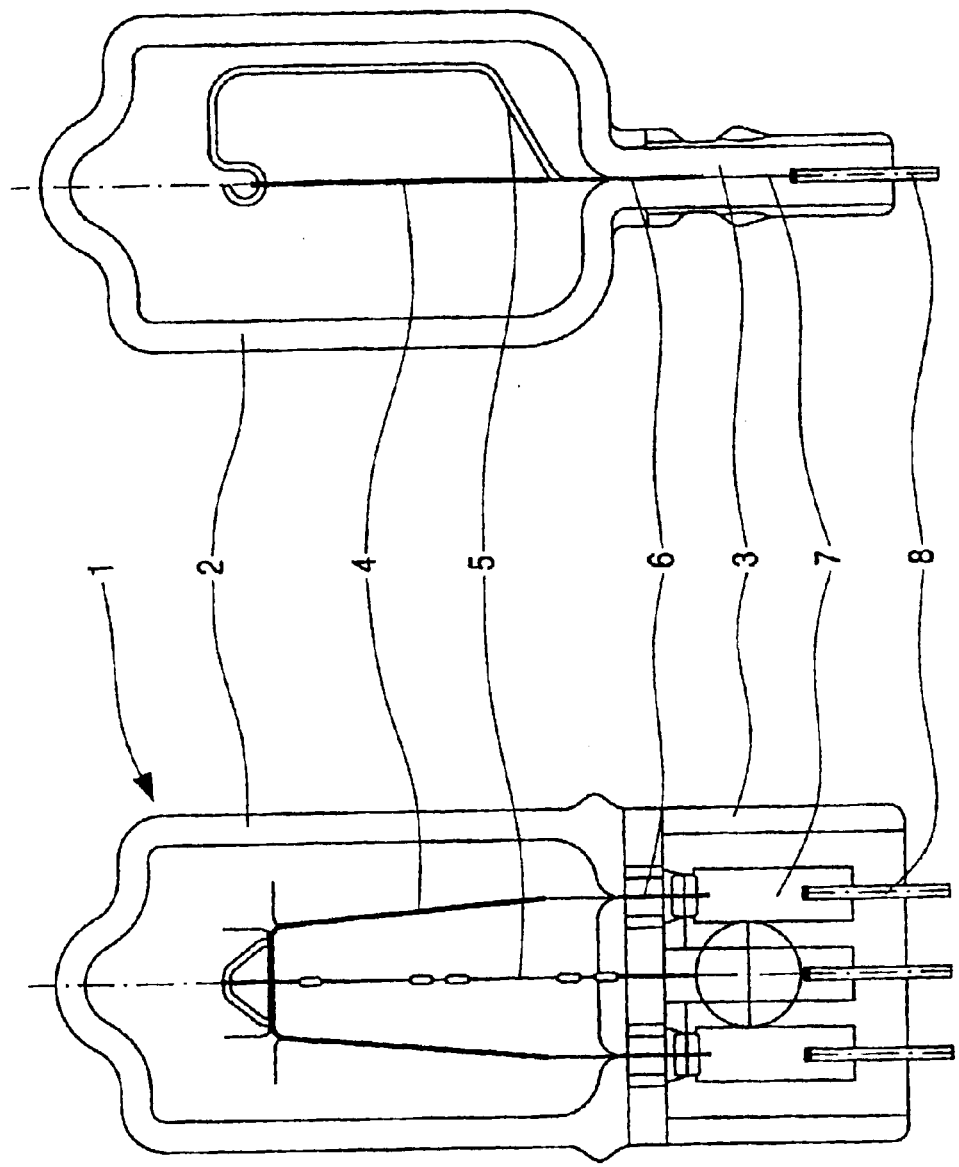

HALOGEN INCANDESCENT LAMP

"This application is a 371 application of PCT/IB02/00784, filed Mar. 14, 2002."

DESCRIPTION

The invention relates to a halogen incandescent lamp for operating on line voltage, at least comprising a hermetically sealed, cylindrical bulb made from transparent material, a filling made from inert gas and a halogen additive, a luminous element, a current supply system, and a mount, which is formed from a single-piece support wire, one end region of which is bent away transversely to the lamp axis, and which retains the luminous element in the vicinity of the end of the bulb remote from the pinch, one end of the support wire being fixed in the vicinity of the end of the bulb near the pinch.

Such a halogen incandescent lamp is disclosed, for example, in DE 41 06 851. The described halogen incandescent lamp pinched at one end has what is termed a rodless mount which is bent from a support wire and supports the luminous element at least twice by means of a transverse part. In addition to the transverse part, the mount comprises two limbs which bear resiliently on the inner wall of the bulb, one of the limbs being sealed in the pinch. Given a relatively low number of components, however, the described solution can be produced technically with much effort and expense only, and so this type of halogen incandescent lamp, which was provided inter alia for general lighting, does not meet the requirements of mass manufacture. These technical difficulties relate, in particular, to the insertion of the mount—with its two limbs—into the bulb. The spring force of the limbs must be overcome in a defined manner during this in order to position the mount accurately in the bulb.

This defined position must subsequently be held, at least until the mount is fixed in the pinch, while maintaining small deviations in position. In the described flat support of the limbs against the inner wall of the bulb, a non-negligible role is played by the tolerances for glass which are usual here, in particular the customary production-induced surface elevations in the case of standard glasses. It is necessary at least for the geometry of the non-sealed limb to be compensated in view of tolerances of the lamp bulb, and this normally requires an additional expenditure.

It is an object of the invention to provide a halogen incandescent lamp which can be produced simply and cost-effectively in technical terms, it being possible for tolerances of the lamp bulb to be disregarded to the greatest possible extent.

The object of the invention is achieved in that a halogen incandescent lamp for operating on line voltage, at least comprising a hermetically sealed, cylindrical bulb made from transparent material, a filling made from inert gas and a halogen additive, a luminous element, a current supply system, and a mount which is formed from a single-piece support wire, one end region of which is bent away transversely to the lamp axis, and which retains the luminous element in the vicinity of the end of the bulb remote from the pinch, wherein a luminous element bent substantially into a U-shape is arranged symmetrically relative to the lamp axis, the luminous element is held twice, that is, at two transversely spaced support points, by the mount in the region of the portion of the luminous element which is arranged transverse to the lamp axis, and one end of the mount is fixed in the pinch.

The invention renders it possible to provide a halogen incandescent lamp whose principal parts, i.e. in particular the lamp bulb and the metal parts to be assembled, in particular the mount and the luminous element, can be prefabricated independently of one another and subsequently connected to one another in a functionally proper and simple way, in particular in conjunction with the manufacture of the pinch.

In a preferred embodiment of the solution according to the invention, one end of the support wire is fixed in the pinch of the bulb so as to be substantially axially parallel between the two parts of the current supply system. This arrangement according to the invention makes optimum use of the available space, which arises in particular from the required minimum spacing of the supply leads.

Under the usual conditions for mass production, namely that the product to be produced is to be realized with the smallest possible expenditure as regards the quality and the quantity of the materials to be used and the further production resources, it is preferred by far for the mount to be formed from an uncoiled, and thus cost-effective, support wire.

It is preferred for the purpose of the invention that the mount comprises a mechanically stable semi-finished product. Such an inherently stable component does not require additional stabilization means, inter alia during mounting, supply, and storage.

A preferred embodiment of the invention relates to the configuration, which is simple according to the invention, of the support wire in the form of a projecting hook whose opening faces the end of the bulb remote from the pinch. This configuration permits a simple threading of the luminous element, and an adequate retention in the mounted state.

A further advantageous embodiment relates to the choice of shape of the luminous element. A luminous element which is a continuous coiled coil, which has at least two luminous sections and at least three non-luminous sections, and of which both ends are at least partial sealed in the pinch, can be manufactured in a particularly cost-effective way and efficiently mounted. For the purpose of the invention, the luminous element, of which the luminous or non-luminous sections are basically not coiled, may be a single coil or a coiled coil.

It is, moreover, favorable for the above mentioned purpose if the luminous element and the supply leads are manufactured from one wire.

It is preferred for the purpose of the invention that the metal inner part of the halogen incandescent lamp, in particular including the luminous element, the mount, the supply leads, the seal foils, and the pin contacts comprise a mechanically stable semi-finished product after the mounting of its above-named parts. Such an inherently stable semi-finished product does not require additional stabilization means, inter alia during final assembly of the halogen incandescent lamp, i.e. in particular the assembly of the glass inner part and the metallic inner part, during supply, and during storage.

The solution according to the invention makes available a halogen light source which can be used in all customary mains voltage ranges, by which a range of approximately 80 V up to 250 V is to be understood, and various power consumptions in the private as well as the professional sphere.

The invention will now be explained in more detail below with reference to an embodiment. In the drawing:

FIG. 1a is a front elevation of a halogen incandescent lamp, and

FIG. 1b is a side elevation of a halogen incandescent lamp.

FIGS. 1a and 1b are the front elevation and the side elevation of a halogen incandescent lamp 1 for general lighting purposes which is suitable for direct connection to a 220 V mains. The halogen incandescent lamp 1 has a cylindrical bulb 2 made from quartz glass with an outside diameter of 12.75 mm and an overall length of approximately 45 mm. The inner space of the bulb 2 is filled in a known way with an inert gas mixture which is known per se, often containing a conventional halogen additive.

The end of the bulb 2 remote from the pinch bears a dome which has what is termed an exhaust tip in the center. The other end of the bulb 2 is hermetically sealed with a pinch 3. The virtually parallel outer surfaces of the single pinch 3, which are produced by the direct action of the pinching tool, are arranged in the center and symmetrically relative to the lamp axis. A plane in which the two ends of the luminous element 4 and one end of the mount 5 are located is present centrally in the interior of the pinch 3 so as to be parallel thereto.

The two limbs of the luminous element 4 bent into the shape of a U, located in the extension of the above-named plane, and arranged symmetrically relative to the lamp axis, widen slightly in a direction toward the pinch 3.

The luminous element 4 has a luminous and continuously coiled section in its central portion. Its two ends, which adjoin directly thereto, which are partly sealed into the pinch 3, and which are connected with electrical conduction to sealing foils 7 embedded in the pinch 3, each have a singly coiled section. The two ends of the single-piece luminous element 4, which consist of a material customary for halogen lamps, simultaneously serve for power supply. These two supply leads 6 are arranged parallel to one another in the pinch 3, a sealing foil 7 and a contact pin 8 following each supply leads in alignment, one behind the other. The two contact pins 8 are connected with electrical conduction to the respective sealing foils 7. They are partly embedded in the pinch 3 and partly project from the pinch 3.

The luminous element 4 is held twice by the mount 5 in that portion which is arranged transverse to the lamp axis. The mount 5, which comprises a coiled and bent support wire and a material customary for halogen lamps, is partly sealed and fixed in the pinch 3, substantially axially parallel between the two parts of the power supply system. The parts of the power supply system are, in particular, the two supply leads 6, the sealing foils 7, and the pin contacts 8. As may be seen in FIG. 1b, the bending line of the support wire lies in a plane which is at right angles to the plane in which the limbs of the luminous element 4 are arranged. At its other end, in the region of the two support points, the support wire is designed as a projecting hook whose opening faces the end of the bulb remote from the pinch.

The metal inner part of the halogen incandescent lamp 1, including the luminous element 4, the mount 5, the supply leads 6, the sealing foils 7, and the pin contacts 8, comprises a mechanically stable semi-finished product which was manufactured in one or more mounting steps before the final assembly of the halogen incandescent lamp 1, i.e. in particular the joining together of the glass part and the metal inner parts.

What is claimed is:

1. A halogen incandescent lamp for operating on line voltage, at least comprising a hermetically sealed, cylindrical bulb (2) made from transparent material and having a pinch (3) at one end and another end remote from the pinch, a filling made from inert gas and a halogen additive, a luminous element (4), a current supply system, and a mount (5), said mount being formed from a single piece support wire, one end region of which is bent away transversely to the lamp axis, and which retains the luminous element (4) in the vicinity of the end of the bulb (2) remote from the pinch, wherein a luminous element (4) bent virtually into a U-shape is arranged symmetrically relative to the lamp axis, the luminous element (4) is held at two transversely spaced support points by the mount (5) in the region of the portion of the luminous element (4) which is arranged transverse to the lamp axis, and an end of the support wire remote from said end region is fixed substantially axially with respect to said bulb (2) in the pinch (3).

2. A halogen incandescent lamp as claimed in claim 1, characterized in that said current supply system comprises two substantially axially parallel parts embedded in said pinch, and an end of the support wire remote from said end region is fixed in the pinch (3) of the bulb (2) so as to be substantially axially parallel between the two parts of the current supply system.

3. A halogen incandescent lamp as claimed in claim 1, characterized in that one end of the support wire is connected to a sealing foil (7) embedded in the pinch (3).

4. A halogen incandescent lamp as claimed in claim 1, characterized in that the mount (5) is formed from a non-coiled support wire.

5. A halogen incandescent lamp as claimed in claim 1, characterized in that the mount (5) is made of a semi-finished product which is stable in a mechanically self-supporting fashion.

6. A halogen incandescent lamp as claimed in claim 1, characterized in that the mount (5) forms in the region of said two support points a projecting hook, whose opening faces the end of the bulb (2) remote from the pinch.

7. A halogen incandescent lamp as claimed in claim 1, characterized in that the luminous element (4) has two luminous and continuously coiled-coil sections, and two ends which have respective coiled sections which are at least partly sealed in the pinch (3).

8. A halogen incandescent lamp as claimed in claim 1, characterized in that the luminous element (4), which has a continuous coiled coil, has at least one luminous section and at least two non-luminous sections.

9. A halogen incandescent lamp as claimed in claim 1, wherein said current supply system comprises two supply leads, characterized in that the luminous element (4) and the supply leads are manufactured from one wire.

10. A halogen incandescent lamp as claimed in claim 1, wherein the luminous element has two ends, characterized in that the current supply system comprises supply leads (6) which connect the ends of the luminous element (4) to scaling foils embedded in the pinch (3).

11. A halogen incandescent lamp as claimed in claim 1, characterized in that the halogen incandescent lamp (1) comprises a metal inner part, the metal inner part comprises the luminous element (4), the mount (5), a supply lead (6), a sealing foil (7), and pin contacts (8), and the metal inner part is made of a mechanically stable semi-finished product.

* * * * *